| United States Patent [19] | [11] Patent Number: | 4,519,999 |
|---|---|---|
| Coleman et al. | [45] Date of Patent: | May 28, 1985 |

[54] WASTE TREATMENT IN SILICON PRODUCTION OPERATIONS

[75] Inventors: Larry M. Coleman, Tonawanda, N.Y.; William Tambo, Chelmsford, Mass.

[73] Assignee: Union Carbide Corporation, Danbury, Conn.

[21] Appl. No.: 383,234

[22] Filed: May 28, 1982

Related U.S. Application Data

[63] Continuation of Ser. No. 135,878, Mar. 31, 1980, abandoned.

[51] Int. Cl.³ .............................................. C01B 33/18
[52] U.S. Cl. .................................. 423/337; 423/342; 423/347; 423/349; 55/71; 55/84; 431/5
[58] Field of Search ............... 413/342, 347, 349, 350, 413/336, 337; 431/5; 55/71, 84

[56] References Cited

U.S. PATENT DOCUMENTS

| 2,614,906 | 10/1952 | Spialter et al. | 423/337 |
|---|---|---|---|
| 3,110,562 | 11/1963 | Hinkle | 423/337 |
| 3,565,590 | 2/1971 | Bracken | 423/342 |
| 3,954,945 | 5/1976 | Lange et al. | 423/337 X |
| 4,036,938 | 7/1977 | Reed | 423/337 X |

FOREIGN PATENT DOCUMENTS 70080 12/1969 German Democratic Rep. ..................................... 423/337

OTHER PUBLICATIONS

White, "Industrial and Engineering Chemistry", vol. 51, No. 3, Mar., 1959, pp. 232-238.
"Low Cost Silicon Solar Array Project" Quarterly Progress Report, Jul.-Sep. 1978, DOE/JPL9543-34-78/8.
"Low Cost Silicon Solar Array Project" Quarterly Progress Report, Jan.-Mar. 1978, DOE/JPL9543-34-78/6.
"Low Cost Silicon Solar Array Project" Quarterly Progress Report Oct.-Dec. 1978, DOE/JPL9543-34-78/9.

*Primary Examiner*—Jack Cooper
*Attorney, Agent, or Firm*—Frederick J. McCarthy, Jr.

[57] ABSTRACT

A battery of special burners, each adapted for the treatment of a particular range of waste material formed during the conversion of metallurgical grade silicon to high purity silane and silicon, is accompanied by a series arrangement of filters to recover fumed silica by-product and a scrubber to recover muriatic acid as another by-product. All of the wastes are processed, during normal and plant upset waste load conditions, to produce useful by-products in an environmentally acceptable manner rather than waste materials having associated handling and disposal problems.

5 Claims, 4 Drawing Figures

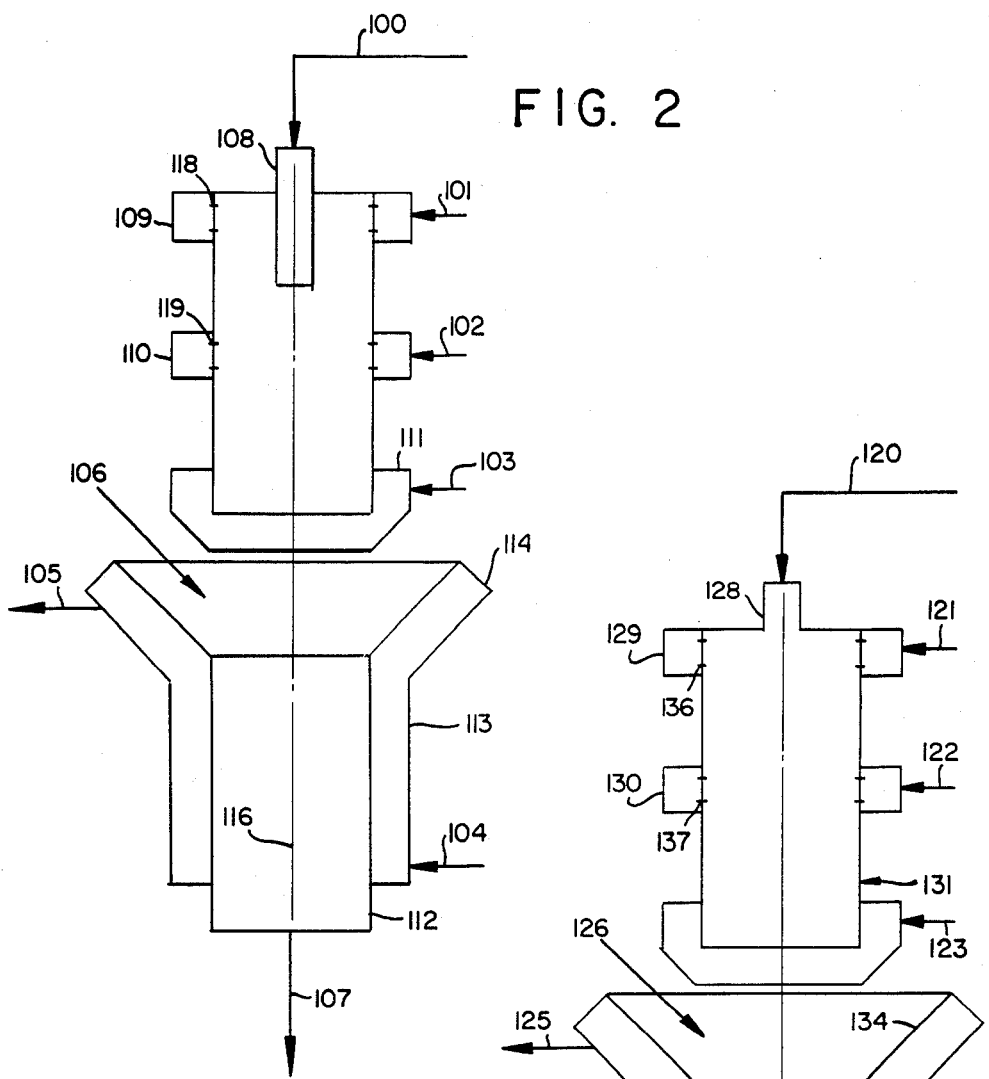

WASTE TREATMENT IN SILICON PRODUCTION OPERATIONS

STATEMENT

The invention described herein was made in the performance of work under NASA Contract Number NAS 7-100, JPL No. 954334, for high purity silicon, and is subject to the provisions of Section 305 of the National Aeronautics and Space Art of 1958 (72 Stat. 435; 42 U.S.C. 2457).

This application is a continuation of application Ser. No. 135,878, filed 3/31/80, now abandoned.

BACKGROUND OF THE INVENTION

1. Field of the Invention

The invention relates to the treatment of wastes generated during the production of high purity silane and silicon. More particularly, it relates to an improved waste treatment system obviating the need for disposal of such wastes.

2. Description of the Prior Art

A process for high purity silicon production presently under development includes (1) hydrogenation of metallurgical grade silicon with hydrogen and silicon tetrachloride, (2) disproportionation of the resulting chlorosilanes to produce high purity silane, and (3) decomposition of the silane to produce high purity silicon, with recycle of by-product and waste materials. A simplified waste disposal technique proposed for incorporation in this process involves condensing a minor portion of unreacted silicon tetrachloride from the chlorosilane gas stream removed from the hydrogenation reaction. Carryover metallurgical silicon powder, metal halides and other impurities present in the gas stream separate with the condensed silicon tetrachloride. Such materials can be subjected to hydrolysis during waste disposal. The process also generates waste gases, such as hydrogen and nitrogen streams removed as dissolved gases from intermediate process liquids and during purging of the process equipment. Additionally, the waste disposal facilities for the process must be capable of handling any plant upsets and associated startup and shutdown conditions as they occur. Such requirements necessitate that the waste disposal facilities be capable of handling the complete spectrum of components present in the overall process. Such components include silicon tetrachloride, mono-, di, and trichlorosilane and silane as well as the other materials indicated above. While the simplified waste disposal technique is an advantageous one, the required capability and flexibility for the handling of such a complete spectrum of gaseous and liquid wastes imposes severe restrictions on the waste removal system. In addition, the waste materials, including hydrated silica sludge, recovered from the process must be disposed of in an environmentally acceptable manner.

Earlier efforts to develop a suitable waste disposal process focused on conventional practices in operating plants producing a range of silicon products. In one such operation involving various silicon-containing wastes including chlorosilanes and silicon tetrachloride, the waste disposal practice includes the burning of the gas waste with subsequent scrubbing of the resultant gas to remove particulate matter. Hydrolysis and lime neutralization are employed in the treatment of liquid waste. Such a waste disposal process is acceptable, but it generates considerable hydrated silica sludge. As in the newer approach referred to above, this sludge must be either stored in settling ponds or processed through filters for ultimate removal as landfill or the like. In addition, operating difficulties, including equipment plugging, necessitate frequent shutdowns for equipment cleaning, thereby increasing the overall costs of the operation intended for the production of low-cost, high purity silicon.

Another prior art practice is based on relatively small operations for the production of cylinder lots of high purity silane from a trichlorosilane feedstock. Waste disposal involves the combustion of the waste gases that are normally chlorosilane or silane itself and the scrubbing of the combusted gas mixture with a series arrangement of high energy Venturi scrubbers. The scrubbed gas is then ejected to the atmosphere, whereas liquid waste passes to a settling tank for eventual disposal to either sewer or landfill. This arrangement is again acceptable for the particular operation, but is based on a relatively narrow range of wastes compared with those expected from a facility intended to produce high purity silane and silicon from metallurgical grade material. This prior art arrangement, as noted, is adapted to handle relatively low levels of waste from a small production operation as compared to the magnitude of wastes to be treated in a commercially feasible metallurgical silicon to high purity silicon production facility.

Based on such prior art practices, it has been proposed for the desired silicon production to combine the burning of gaseous wastes with the scrubbing of the resulting vent gases and subsequent neutralization of liquid waste by lime and water addition thereto. The sludge thus formed would be filtered for removal as landfill, whereas the clear liquid would be used in the scrubbing step. Such an approach, however, has the same limitations and drawbacks as pertain to the prior art practices, accelerated by the broad range of waste components encountered in the desired silicon production by hydrogenation of metallurgical silicon to trichlorosiliane, disproportionation of the trichlorosilane to silane or mono or dichlorosilane, and decomposition of said silane, mono or dichlorosilane to high purity silicon in a fluid bed or free space reaction zone or by a Siemens-type reaction.

There is a desire in the art therefore, for improvements in the waste treatment or disposal operations pertaining to the conversion of metallurgical grade silicon to high purity silane or silicon. There is, in particular, a need to provide for such waste treatment in an environmentally acceptable manner that does not unduly add an incremental cost to the high purity silane or silicon operation. This is of importance in ligh of the genuine need in the art for the development of features to enhance the prospects for effectively utilizing high purity silicon on a commercially feasible basis for solor cell and semiconductor applications.

It is an object of the invention, therefore, to provide an improved waste treatment system for use in the production of high purity silane and silicon from metallurgical grade silicon.

It is another object of the invention to provide a waste treatment process obviating the waste disposal requirements of conventional techniques used in the production of silane and organo-silicon products.

It is a further object of the invention to provide an improved waste treatment approach enhancing the prospects for producing low-cost, high purity silane and silicon from metallurgical grade silicon.

With these and other objects in mind, the invention is hereinafter disclosed in detail, the novel features thereof being particularly pointed out in the appended claims.

SUMMARY OF THE INVENTION

The objects of the invention are accomplished by a process and apparatus in which separately isolated light gas waste, heavy gas waste and liquid waste are each burned in separate burners adapted particularly for the burning of such wastes, with filtration means being provided for the recovery of by-product silica from the combined combustion gases from said burners and absorption means for recovering muriatic acid as another useful by-product. All of the wastes produced in chlorosilane, silanes and silicon production operations, during normal and upset plant conditions, are handled in an environmentally acceptable manner. The necessity for developing, handling and disposing of difficult to handle sludge material or dirty vent gas streams is obviated. The invention includes desirable redundancy features to accommodate unexpected or unusual circumstances and to ensure the conversion of all waste materials to useful silica and acid by-products and environmentally clean exhaust gas.

BRIEF DESCRIPTION OF THE DRAWINGS

The invention is hereinafter described in detail with reference to the accompanying drawings in which:

FIG. 2 is a schematic representation of a modified burner for the light gas waste component treated by means of the invention;

FIG. 3 is a schematic representation of a modified burner for the heavy gas waste component treated in the practice of the invention.

DETAILED DESCRIPTION OF THE INVENTION

Figure 1:
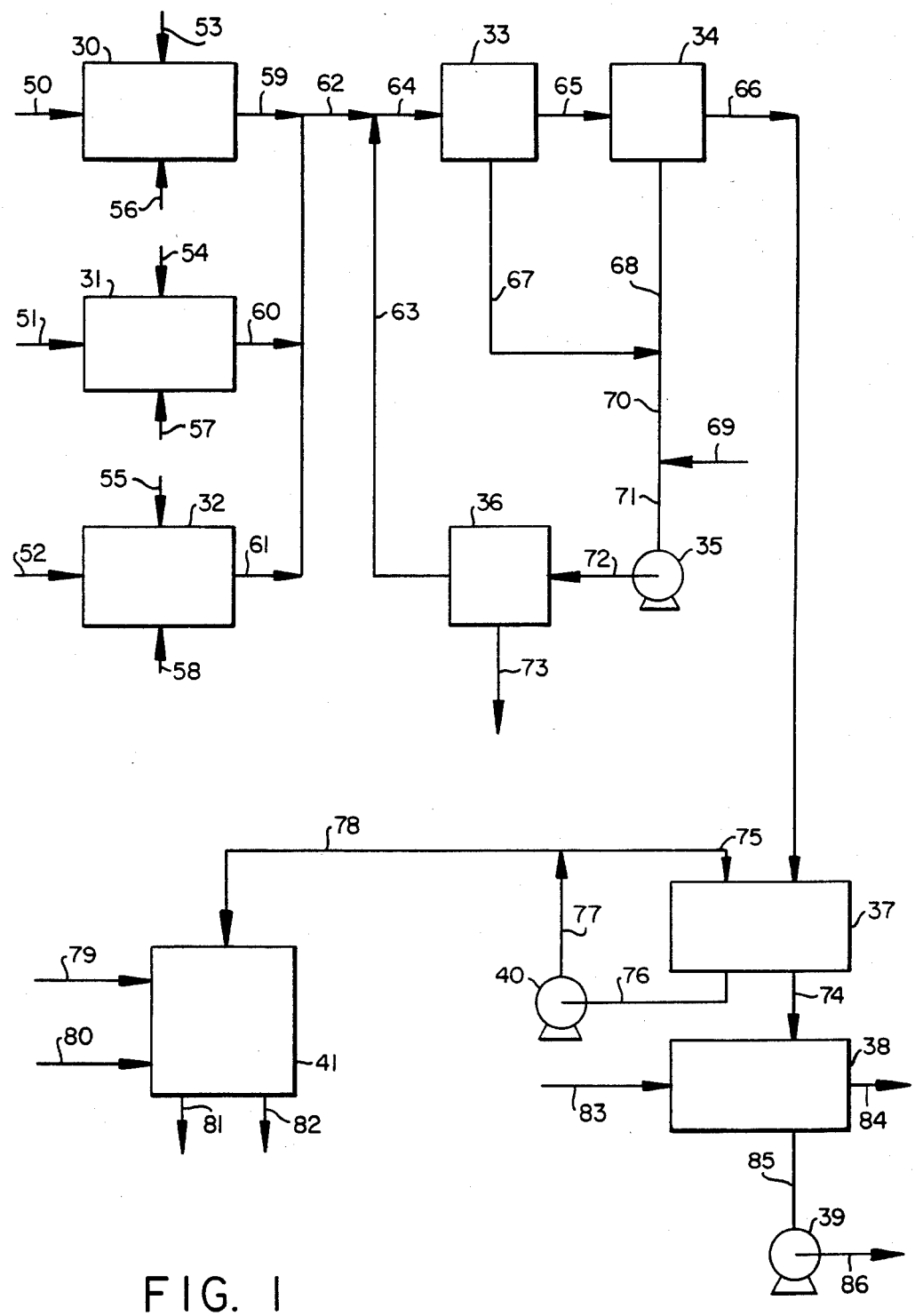
FIG. 1 is a simplified process flow diagram illustrating an embodiment of the overall process of the invention.

The invention provides for improved waste treatment in the production of high purity and ultrahigh purity silane and silicon from metallurgical grade silicon. The invention is capable of handling the complete range of waste components encountered in such production facilities on either a normal or upset load basis. Moreover, such wastes are handled in an environmentally acceptable manner, producing useful by-products rather than hard-to-handle, and dispose of, final waste materials.

In the prior practice combining gas waste combustion, scrubbing of the combusted gases prior to atmospheric venting, and neutralization of liquid waste, all gas waste is handled by an appropriate burner with addition of fuel and combustion air. The products of combustion and excess air are passed to a scrubber fed by recycle liquid from a downstream filtering step. A combined gas and liquid stream therefrom contains clean gases in the vapor phase and particulate matter in the liquid phase. Upon separation, the clean gas is vented to the atmosphere. The liquid, containing particulate and waste material, is combined with any other liquid wastes from other portions of the process, hydrolized by the addition of water and neutralized by lime addition to form a range of chlorides and hydrated silica sludge. Upon filtration in a settling pond or mechanical filtering equipment, a relatively clean liquid is recovered from the sludge and used in the scrubbing step. Uniform burning of the variety of waste components is difficult to achieve with the single burner for all gas wastes, particularly in light of the different burining characteristics and the need for different handling of the waste, fuel and air streams for optimum burning. The hydrated sludge is difficult to filter because of its propensity to adsorb on the filter medium and render it inoperative and because of the difficulty in consolidating the sludge. Even after filtering, the sludge often contains 80–90% water, adding to the disposal hauling coists and precluding the consolidation of the waste. The costs for the substantial amounts of lime and water required for hydrolysis and neutralization for the liquid and scrubbing wastes contribute to the economic costs and to the overall technical and economic drawbacks that are overcome in the practice of the invention.

In the advantageous practice of the invention, a battery of special burners is employed, each adapted for the treatment of a particular range of waste materials, together with filters to recover a suitable silica by-product and a water scrubber-adsorber to absorb the hydrogen chloride content of the gas stream and to recover muriatic acid as another by-product. All of the wastes are thus handled in an environmentally acceptable manner to produce useful by-products rather than waste materials having the drawbacks and difficulties discussed above with respect to the use of a combination of conventional waste treatment techniques. For increased flexibility and redundancy to ensure that the invention is capable of producing useful by-products and of handling any waste load that may be required, various features may be added to the system. For example, two bag filters may be employed in series to ensure that the particulate solids present in the combustion product are removed to a desirably high degree. A clean-up scrubbing step may also be incorporated between the silica filter and acid absorption step to ensure high quality acid by-product production. The scrubbing step involves a final liquid scrubbing of the gases to ensure very complete removal of any suspended solids and a very clear high quality acid by-product. Another desirable redundancy involves the incorporation of a stand-by reactor and filter step capable of handling liquid waste that may contain a range of products normally obtained from the silicon production process. Such a procedure would hydrolyze and neutralize the liquid waste with lime and water and subject the resultant liquid to filtration to produce a sludge waste material useful for landfill and a neutralized liquid waste material capable of being disposed in the usual industrial sewer lines. This latter procedure will be understood to constitute only a redundancy feature of the invention. In normal operation of the invention, this procedure would not be expected to be required since the waste will be combusted and handled only to form by-product silica, muriatic acid and clean gases that can be vented to the atmosphere.

In FIG. 1 of the drawings, a battery of three burners 30, 31 and 32 are shown, each dedicated to a particular range or type of waste material. Burner 30 is adapted to handle a light waste gas from line 50, with appropriate fuel being injected into the burner from line 53 for combustion with air supplied through line 56. A combustion product stream 59 is withdrawn from said burner 30. Burner 31, on the other hand, is especially adapted to handle heavy gas waste from line 51, with appropriate fuel being injected into burner 31 through line 54 for combusion with air from line 57. A combusted product stream 60 is withdrawn from said burner 31. Burner 32 is adapted to handle a liquid waste from line 52 by appropriate combustion of fuel from line 55 with air from line 58. A combustion product stream 61 is withdrawn from burner 32. It will be appreciated that the light gas waste, the heavy gas waste and the liquid waste are separately collected in the course of the particular process employed for converting metallurgical grade silicon to high purity silane and/or silicon. The combined prior practice referred to above, on the other hand, involves passage of all of the gas waste to a single burner with the resulting combustion product stream passing to a scrubber and a separating zone from which liquid waste passes to a hydrolysis and neutralization reactor along with other liquid waste materials separated in the process. Thus, lines 50, 51 and 52 pass light gas waste, heavy gas waste and liquid waste, respectively, from separate collection means or other sources of such waste materials to the separate burner particularly adapted to handle that specific range or combination of waste materials.

All of the combusted product streams, i.e. streams 59, 60 and 61 are combined into one stream 62 and then added to recycle stream 63 to form feed stream 64 that is passed to initial bag filter 33. This filter has the function of removing the silica particles present in said feed stream 64 so as to pass a relatively clean effluent gas stream 65 to the next processing step. The bag filter 34 is intended primarily as a redundancy, but it ensures still higher quality effluent effluent 66 by recovering remaining silica that may bypass filter 33. Filtered silica stream 67 and said stream 68 from filter 34 are combined in line 70 and added to a relatively small hot gas stream 69, resulting in a combined hot gas stream 71. Hot gas stream 69 can be easily obtained by combustion of natural gas with a small amount of air to obtain the desired temperature. Alternately, said hot gas 69 can also be an available process flue gas stream or other hot waste stream. Blower 35 is used to move the hot gas stream at increased pressure through line 72 to a cyclone separator 36 from which by-product silica is recovered through line 73. The cyclone separator is capable of removing the relatively small silica particles in a fashion suitable for direct use as a saleable by-product. The treated gases removed from separator 36, perhaps containing some fine material that may pass through the separator, is recycled through line 63 to the filter step as indicated above.

The cleaned gases 66, largely free of silica particulates, are passed from the filter zone through line 66 to another scrubber 37 for final cleanup purposes. The scrubbing action therein is intended to remove only residual particulate fines that may still be present after the bag filter step. A high energy venturi-type unit can conveniently be employed. Scrubber 37 utilizes a recirculated liquid stream 75 for the final cleanup set. Normal operation of this scrubber will involve only such liquid recycle, i.e. liquid movement without any net throughput required since the particulate load at this stage of the overall process will normally be very small. For such operation, stream 78 existing from the liquid circuit would not be operable, and the liquid would be recirculated from scrubber 76 to pump 40 and through lines 77 and 75 to scrubber 37. Following final scrubbing cleanup in said scrubber 37, gas stream 74 is passed to absorber 38. This absorption unit contacts the gas with water stream 83 to produce a relatively dilute muriatic acid by-product 84 and a clean gas stream 85. The final cleanup step in scrubber 37 ensures removal of all particulate matters and thereby ensures the clarity of said acid product 84 and the desirable quality of the product for sale as a useful by-product material. Blower unit 39 serves to overcome the pressure drop of the gas movement through the process system and to develop the pressure head necessary to vent clean gases 86 to the atmosphere.

The combined reactor-filter unit 41 is needed only for standby purposes. Normally, this unit would not have any liquid waste to process and would not be operated. During any unusual load on the waste treatment system or some unexpected equipment malfunction, it may happen that the waste materials could concentrate in the liquid recycle associated with the final scrubber 37. Under such circumstances, some liquid recycle 78 could be withdrawn from this loop and fed to said reactor-filter 41 through line 78. By the addition of water 80 and lime or other alkali 79 to the reactor-filter unit 41, hydrolysis and neutralization of the waste can be conveniently carried out. Following the conversion of this waste to hydrated silica solids and liquid wastes, the filter unit would separate sludge that is removed through line 81 for eventual disposal or use, as for landfill purposes. A neutralized liquid waste stream is also removed from reactor-filter 41 for eventual disposal to available sewers. Once again, this arrangement is intended only for standby purposes and is a redundant feature built into the system to ensure the capability of handling the waste load of the silicon production process under any foreseeable circumstance. It should be noted that additional scrubber 37 has the tendency to average the load to the final scrubber or absorber 38. The recirculating liquid can absorb or desorb material dependent on the purity of the gas throughput. The recirculating liquid can thus serve to modulate load fluctuations to the final scrubbing step.

An important aspect of the subject technology resides in the realization that a single burner arrangement is not suitable to handle the variety of waste materials present in the subject silicon production facilities. The burner characteristics of the materials ranging from silane to silicon tetrachloride are so different that a conventional single burner simply can not be adapted for good combustion of the range of materials involved. At best, a single burner must provide a compromise based on the different characteristics of the materials and would not be expected to provide an optimum combusting result. The battery of burners employed in the practice of the invention are each especially adapted to the category of wastes that it will handle in the course of silicon production operations. The special adaptations of burners for each category of waste are important to the improved waste treatment system herein disclosed and claimed, as good combustion of each category of waste facilitates the desired production of by-product silica and acid in an environmentally acceptable manner.

The modified burner shown in FIG. 2 is adapted for the handling of light waste gases. Such light gases would include silane, hydrogen and any vent gases from the stripper column commonly employed upstream of the chlorosilane disproportionation-separation section of a silicon production operation. This vent gas from such stripper column may contain quantities of hydrogen, helium and perhaps monochlorosilane. It will be appreciated that such light waste gases may be separated by some other means in particular processing schemes for the production of high purity chlorosilanes, silane and/or silicon. The modified burner FIG. 2 is especially adapted to handle the silane component of the light gas waste. Silane gas itself is pyrophoric and merits special handling to avoid problems associated with its uncontrolled combustion, such as hot spots in the burner, silica deposition within the burner, and the like. In said FIG. 2, light gas waste stream 100 enters the central nozzle 108 of the burner corresponding to burner 30 of FIG. 1. Said nozzle 108 is located on the axial center line 116 of the burner. Supply ring 109 is supplied with appropriate perforations or nozzles 118 to introduce a blanketing inert gas stream from line 101. Such inert gas stream, typically nitrogen, has the function of forming a gas envelope or shroud around the light gas waste introduced into the burner through nozzle or supply inlet 108. Downstream of the inert gas injection, another supply ring 110 and associated perforations or nozzles 119 are provided to introduce fuel from line 102 to the burner. The fuel may, for example, comprise a small stream of hydrogen or natural gas. Further down the burner inlet is natural gas pilot flame 103 maintained by appropriate supply and nozzle ring 111. Receiver cone 113 is provided for the open flame maintained by the burner and directed from the burner nozzle down said cone. This cone has the function of controlling the open gas flame duration and temperature. The gas flame temperature is controlled by two means. One means is by aspirated air stream 106 injected between the burner nozzle and receiver cone flange 114 and into receiver cone 113, as at the downward inclined angle shown in the drawing. The second means of temperature control is coolant air from coolant air inlet stream 104 that exists from said cone 113 through coolant air exit 105 at the top of said cone. This burner arrangement ensures that the flame temperature is controlled so that the desired complete combustion of the waste is maintained, furthering the desired formation of the silica particulates that result when combustion is so controlled. Since the silica particulates formed by combustion of the light gas waste in such a burner are a function of temperature, the temperature control provided by the burner is important to the ensuring the formation of particulates that are large enough for suitable filtering subsequently in the system. Particulates in the 1–10 micron range have been found convenient for such purposes. Uncontrolled combustion of silicon-containing wastes often result in the formation of very small, i.e. less than one micron size, particulates that are extremely difficult to filter and remove from the resultant combustion gases. Following the controlled combustion of the light gas waste in the burner, the combustion gases are passed through exit pipe 112 to filter 107. It will be understood that said pipe 112 and filter 107 correspond to line 59 and filter 33, respectively, as shown in FIG. 1.

The modified burner for heavy gas waste, as illustrated in FIG. 3, is somewhat similar to the light gas burner, but has important adaptations to tailor it for efficient combustion of heavy gas waste. Such waste includes the heavier chlorosilanes and silicon tetrachloride as a vapor. The efficient combustion of such heavy gas waste requires that the supply of hydrogen to ensure conversion to hydrogen chloride along with silicon dioxide, i.e. silica. A heavy gas waste stream 120 is introduced at the centerline 135 of the burner through supply inlet 120. At this point, supply ring 128 with associated perforations or nozzles 136 introduce fuel stream 121 into the burner, with the fuel being thoroughly mixed with the heavy gas waste. The fuel stream is the source of the hydrogen required for efficient combustion of the heavy gas waste and can typically be methane, i.e. natural gas. Following such mixing of the hydrogen-containing fuel and heavy gas wastes, the wastes, the resultant mixture is passed down the burner to the point where another supply ring 130, with associated perforations or nozzle 137, introduces the combustion air stream 122 to the burner. The resultant mixture then moves down the burner and is fired by supply nozzle ring 131 that introduces a small amount of natural gas fuel 123 to initiate and maintain firing under all operating conditions. As with the burner of FIG. 2, the flame is maintained at the end of the burner nozzle by drawing it into receiver cone 132. The flame conditions can be maintained by means of aspirated air 126 drawn into the flame between the burner and receiver cone 134, by the control of combustion air 122, and by coolant air, which enters cone 132 from inlet line 124 and exits through line 125. It will be understood that, in some embodiments, the coolant jacket may not be included depending on the specific requirements of a given application. The combusted gases are passed through pipeline 133 to a subsequent filter 127. It will be understood that said pipeline 133 and filter 127 correspond to line 60 and filter 33, respectively, as shown in FIG. 1.

The combustion gases existing from the burner through said pipeline 133 will generally contain silica, $SiO_2$, and hydrogen chloride, HCl, which subsequently become the by-products of the waste treatment operation of the invention. The temperature is controlled so as to achieve a desirable particulate sizing of the silica formed during the flaming process.

Figure 4:
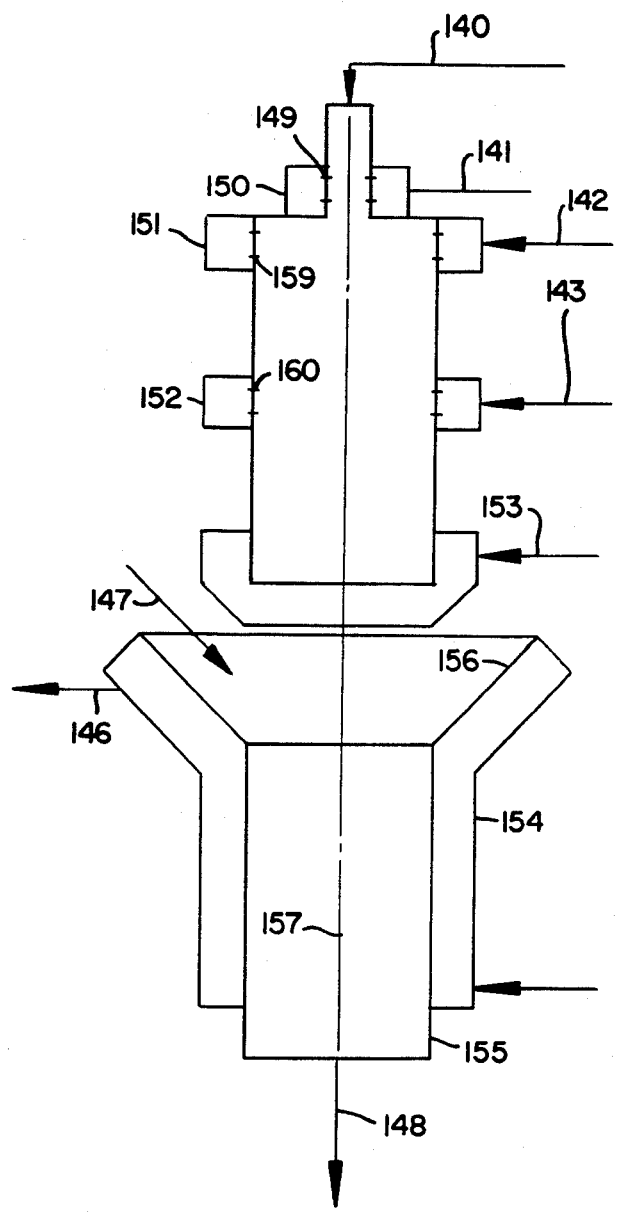
FIG. 4 is a schematic representation of a modified burner for liquid waste treatment by the invention.

The modified burner for liquid wastes, as illustrated in FIG. 4, employs a small atomization air stream 140 introduced to the burner, corresponding to burner 32 of FIG. 1, by supply line 149 at the axial centerline 157 thereof. Liquid waste stream 141 is introduced through appropriate supply nozzle ring 150 having openings 158 such that the atomization air proceeds to develop a spray of liquid waste. This gas-liquid spray is then mixed with fuel from line 142 introduced to the burner through appropriate supply nozzle ring 151 having appropriate perforations or nozzles 159. This fuel mixing step ensures the introducton of hydrogen-containing fuel for the subsequent efficient combustion of the liquid waste. The entire mixture moves down the burner and is then combined with combustion air from line 143 that enters the burner through supply nozzle ring 152 having appropriate perforations or nozzles 160. Finally, the entire mixture passes to the outlet of the burner where it is ignited by a small natural gas pilot stream 144 supplied through nozzle ring 153. The open flame is drawn into receiver cone 154 where its temperature is controlled by aspirated air 147, together with combustion air 143, and coolant air surrounding receiver cone 154, if employed. For such purpose, coolant air inlet 145 and coolant air outlet 146 are shown in the drawing. The combusted gas products are removed from receiver cone 154 through conduit 155 corresponding to conduit 61 in FIG. 1 to the subsequent filtering step, together with the combustion gases from lines 59 and 60 as shown in said Figure.

The three burner arrangement for waste treatment disclosed and claimed herein ensures that the complete range of waste ranging from hydrogen, silane, chlorosilanes, silicon tetrachloride, as well as suspended silicon, can all be handled optimally from a combustion viewpoint. By the use of burners especially modified to ensure that combustion of each category of waste is under optimum conditions for the essentially complete combustion of such wastes to silicon dioxide and hydrogen chloride, the resulting combustion gas can be properly and advantageously cleaned to produce the silica and acid by-products as referred to above.

It will be understood that various changes and modifications can be made in the process and apparatus as hereinabove described without departing from the scope of the invention as set forth in the claims. For example, it would be within the scope of the invention to utilize only a single filter in place of separate filters 33 and 34 as shown in FIG. 1 and employed for increased operating flexibility and redundancy ensuring that the particulate solids present in the combustion gases are removed to a high degree. In some embodiments and for certain applications, it might be acceptable and desirable to omit the clean-up scrubbing zone between the silica filter and acid absorber units, although the incorporation of such additional scrubbing zone is generally preferred to ensure high quality by-product acid production essentially free of any suspended solids. As noted above, the incorporation of the stand-by reactor and filter is a redundant filter the use of which is not required in the normal operation of the waste treatment system in accordance with the invention.

Those skilled in the art will appreciate that any commercially available burners suitable for the essentially complete combustion of one of the particular categories of waste materials produced in silicon production operations can be used in the practice of the invention. The three types of burners described herein represent standard burners especially modified to ensure the combustion of each category of waste under optimum conditions so that combustion is essentially complete to the formation of the desired silicon dioxide and hydrogen chloride by-products. Thus the light waste gas separately collected will typically include silane, hydrogen and possibly vent gases from the chlorosilane disproportionation section of an overall silicon production operation or a stripper column upstream therefrom. The light gas waste burner, either the modified burner of FIG. 2 or other suitable burner, is adapted to properly combust such light gases and product the desired by-product silica. The heavy gas waste of said silicon, typically including the range of chlorosilanes including mono, di and trichlorosilane material, togethere with nitrogen or other inert gas purge that might be used in an intermittent fashion throughout the process, are combusted essentially to completion producing the by-product silica and acid material referred to above. The liquid waste, composed primarily of silicon tetrachloride and possibly some of the chlorosilanes in a combined chlorosilane-silicon tetrachloride mixture, are combusted to produce additional quantities of said silica and acid by-product material.

The invention is carried out by collecting or otherwise separately isolating and treating the light gas waste, the heavy gas waste and the liquid waste of silicon production operations. As noted above, one such operation involves the hydrogenation of metallurgical grade silicon and silicon tetrachloride to produce chlorosilanes, primarily trichlorosilane, disproportionation of such chlorosilanes to produce high purity silane and recycle silicon tetrachloride, and decomposition of said silane in a free space reactor or fluid bed reactor to produce high purity silicon and by-product hydrogen that can be recycled. Those skilled in the art will appreciate, however, that numerous chages can be made in the individual processing steps employed while producing the combination of wastes treated in the practice of the invention. Thus, a Siemens-type reactor can be employed for silane decomposition, or for the decomposition of trichlorosilane, dichlorosilane and/or monochlorosilane without disproportionation completely to silane before decomposition. Furthermore, the combination of wastes will pertain in other embodiments in which high purity silane and/or other chlorosilanes are produced but without subsequent conversion to high purity silicon. Likewise, metallurgical grade silicon can be converted to chlorosilanes by reactions other than the indicated hydrogenation with silicon tetrachloride approach. Thus, the reaction of metallurgical grade silicon with HCl to produce chlorosilanes will similarly result in a combination of light gas waste, heavy gas waste and liquid waste that can be conveniently separated and treated in the practice of the invention. It should also be noted that such operations are not limited to those employing chlorosilanes, but can be applied to similar operations using other halosilanes although chlorosilanes are preferred for such purposes. Those skilled in the art will also appreciate that various commercially available apparatus can be employed for purposes of the invention. For example, various bag filter designs, cyclone separators or other suitable gas-solid separation devices can be employed in the practice of the invention to achieve the desired separation of the silica by-product from the combined combusted gas stream.

The indicated burner adaptations for acceptable handling of the three categories of waste are adequate for purposes of the invention, and no other direct control of the waste feedstocks are required. The temperatures of the flame for each burner will generally be controlled at about 2,000° F. or less in order to ensure sufficient growth of the silica particulates formed upon combustion to a size suitable for subsequent filtration and recovery. Temperature control can be maintained by a combination of coolant air and the quantity of aspirated air fed to the receiver cone. The quantity of aspirated air can be altered to some extent by controlling the pressure within the receiver cone. This pressure is maintained on the system by means of a vent gas blower to overcome all of the hydraulic pressure drop throughout the system. Following the filter step of the process, the fumed silica is desirably reheated to at least about 700° F. by the addition of hot gases in order to ensure desorption of hydrogen chloride from the particulate silica product, thus ensuring that the silica product has the desired quality for sale as a useful by-product. The temperature of the filtration step must be at dry conditions to prevent any hydration of the silica dust in the gas stream. Normally, temperatures of about 300° F. to about 400° F. will be sufficient to maintain such suitable operating conditions. The final cleanup scrubbing step is performed such that any residual silica particulate matter in the combustion gas stream is removed to assure visual clarity of the acid product.

By employing the invention in the system as shown in FIG. 1 with the use of modified burners as shown in FIGS. 2-4 of the treatment of the three categories of waste as produced in the conversion of metallurgic grade silicon to chlorosilanes, disproportionation thereof to high purity silane and decomposition of said silane to high purity silicon, a silica by-product is produced that is free of contaminants and has suitable bulk to ensure handling as a by-product. Additionally, such practice of the invention ensures that the acid product has the clarity required for acid by-product purposes. For this purpose in such illustrative example, each of said burners is controlled at slightly under 2000° F. and the fumed silica is heated, following filtration at about 350° F., to about 700° F. by means of hot gases from line 69 as shown in FIG. 1. The process of the invention ensures that the silica recovered in line 73 of said FIG. 1 and the acid recovered from absorber 38 through line 84 are of sufficient quality to have reasonable value on the by-product market. This will be seen to significantly reduce the cost associated with the waste treatment operation. The vent gas discharged through line 86 is environmentally acceptable for such discharge.

The invention ensures optimum combustion of a wide range of waste materials generated in the production of chlorosilanes or other halosilanes, high purity silane and/or silicon. The wastes are easier to treat in the practice of the invention than in conventional techniques, and minimize or totally obviate the necessity for disposing of difficult to handle sludge waste materials or dirty vent gas streams encountered in such conventional practice. The invention will thus be seen to contribute to the simplified processing and decreased costs desired and needed to enhance the prospects for employing high purity silicon in the production of solar cells for commercial application and in other desirable commercial semiconductor applications. The desirable waste treatment system of the invention can likewise contribute significantly to the reduction in costs of operations in which chlorosilanes are produced for other ultimate purposes, but where the wide range of waste materials discussed above must be disposed of in an environmentally acceptable manner as part of the overall processing operation.

What is claimed is:

1. A process for the enhanced disposal of gaseous and liquid wastes formed during the hydrogenation of metallurgical grade silicon and silicon tetrachloride to produce chlorsilanes, primarily trichlorosilane, disproportionation of such chlorosilanes to produce high purity silane and silicon tetrachloride, and decomposition of said silane in a free space reactor or fluid bed reactor to produce high purity silicon and by-product hydrogen, wherein said wastes are present as a light gas waste including silane and hydrogen, a heavy gas waste including mono, di and trichlorosilane, and a liquid waste including silicon tetrachloride, said process comprising:
    (a) separately collecting the light gas waste, heavy gas waste and liquid waste formed in such production operations;
    (b) burning said light gas waste in a burner adapted to ensure essentially complete combustion thereof at a temperature not exceeding about 2,000° F. and sufficient to ensure that the silica particulates formed as a result of said combustion are of a size to facilitate subsequent filitration thereof from the resultant combustion product gases;
    (c) burning said heavy gas waste with a hydrogen-containing fuel at a temperature not exceeding about 2,000° F. in a separate burner adapted to ensure essentially complete combustion of said waste to hydrogen chloride and silica of a particle size sufficient to facilitate subsequent filtration thereof from the combustion product gases;
    (d) burning said liquid waste at a temperature not exceeding about 2,000° F. with a hydrogen-containing fuel in a separate burner adapted to ensure essentially complete combustion of such waste to hydrogen chloride and silica of a particle size sufficient to facilitate subsequent filtration thereof from the combustion product gases;
    (e) passing the combustion product gases from said separate burners to two bag filters units in series for separation of silica therefrom;
    (f) passing the combustion gases from said filter units to a liquid scrubbing zone for final cleanup ensuring that all particulate matter is removed therefrom, said zone having a stream of liquid withdrawn therefrom and recycled to said zone;
    (g) contacting said filtered silica with a hot gas stream to a temperature of at least about 700° F. to ensure desorption of hydrogen chloride therefrom;
    (h) passing the filtered silica in said hot gas stream through a cyclone separation zone for recovery of by-product silica;
    (i) passing the combustion gases from said scrubbing zone to an absorption zone for contact with water therein thus producting dilute muriatic acid therein;
    (j) recovering by-product muriatic acid from said absorption zone;
    (k) withdrawing residual combustion product gas from said absorption zone, whereby all of the wastes produced are processed to form useful by-products and clean residual combustion product gas that can be vented to the atmosphere.

2. The process of claim 1 and including withdrawing a portion of said scrubbing zone recycle liquid to a hydrolysis-neutralization zone for contact with water and alkali therein, thereby treating waste materials that may form in said recycle liquid as a result of unusual load conditions.

3. The process of claim 1 in which said light gas waste, heavy gas waste and liquid waste are formed in the conversion of metallurgical grade silicon to a trichlorosilane-containing stream and the disproportionation of said trichlorosilane-containing stream.

4. The process of claim 3 in which said disproportionation is to produce dichlorosilane for conversion to high purity silicon.

5. The process of claim 3 in which said disproportionation is to produce silane for conversion to high purity silicon.

* * * * *